Patented Jan. 18, 1944

2,339,739

UNITED STATES PATENT OFFICE 2,339,739

DYEING CELLULOSIC FIBER WITH PHTHALOCYANINES

Harold Blackshaw and Norman Hulton Haddock, Blackley, Manchester, England, assignors to Imperial Chemical Industries Limited, a corporation of Great Britain No Drawing. Application May 22, 1942, Serial No. 444,106

8 Claims. (Cl. 8—1)

The present invention relates to the coloring of cellulosic fiber, this application being a continuation-in-part from our copending application Serial No. 355,692, filed September 6, 1940. More particularly this application relates to dyeing or printing of cellulosic fiber by impregnating the same with a diazotized poly-aminophthalocyanine compound, and subsequently submitting the impregnated fiber to an aftertreatment as hereinafter described, to decompose the diazonium groups, producing a water-insoluble dyestuff on the fiber.

This invention is based on the discovery that diazotized di-, tri- and tetra-amino-phthalocyanines have affinity for cellulosic fibers, which they dye in the same way as, for example, diazo dyestuffs derived from benzidine, and that by treating the cellulosic fibers with the said diazotized poly-amino-phthalocyanines, in the manners described below, violet to green and grey shades of good fastness properties are obtained thereon.

When we speak of diazotized poly-aminophthalocyanines, we are referring to compounds obtainable by treating di-, tri- or tetra-aminophthalocyanines, for instance tetra-amino-copper-phthalocyanine, tetra-amino-cobalt-phthalocyanine, tetra-amino - metal - free - phthalocyanine, or their homologs, analogs and nuclear substitution derivatives, such as chloro, nitro, alkyl, alkoxy, etc., derivatives, with various quantities of nitrous acid, to diazotize at least some of the amino groups. The preferred procedure is to use sufficient nitrous acid to diazotize theoretically all the amino groups present in the molecule. But even here there is no certainty as to the number of diazonium groups in the final compound, because the resulting compound is generally not stable and may undergo partial decomposition before it has a chance to be applied to the fiber.

The after treatment is carried out by treating the cellulosic fiber, which has been impregnated with the diazotized poly-amino-phthalocyanine, in the presence of substances which will facilitate, accelerate, or cause removal of diazonium groups. This group of substances may include organic and inorganic compounds, and may include such as will react with the diazonium groups to substitute other atoms or radicals for the same, as well as such which simply decompose the diazonium chloride groups, resulting in nuclear hydroxy derivatives of the phthalocyanine compound. But in any event, the common characteristic of the members of this group is their ability to facilitate or cause the removal of nitrogen when the impregnated fiber is warmed up in their presence.

Among the numerous compounds which may be used for the purpose of our invention the following may be named as typical: Water, ethyl alcohol, potassium iodide, potassium bromide, potassium ethyl-xanthate, sodium ethyl-xanthate, pyridine, sodium stannite, sodium sulphite, sodium oleyl-sulphate, potassium ferrocyanide, ammonia, sodium sulphide, formic acid, sodium thiosulphate, benzoquinone, hydrazine sulphate, potassium cyanate, sodium formate, sodium hypophosphite, sodium thiocyanate, sodium cuprocyanide and alkaline formaldehyde.

The said substances may be applied to the cellulosic fiber, which has been dyed or printed with the phthalocyanine diazo compound, in any convenient way, for example by boiling the fiber in their aqueous solutions, or by steaming the printed fiber.

Accordingly, the present invention relates to a process for dyeing or printing cellulosic fiber, which comprises impregnating the fiber with a solution or printing paste containing a diazotized poly-amino compound of the phthalocyanine series, and subsequently treating the impregnated fiber in such a manner as to decompose the diazonium groups liberating nitrogen, preferably in the presence of substances of the above-defined class which are adapted to facilitate the removal of nitrogen, producing a waterinsoluble compound on the fiber. In this way, according to this invention, there are obtained on cellulosic fibers violet to green and grey shades of good fastness properties, including fastness to washing.

For dyeing, the cellulosic fiber, e. g. cotton or regenerated cellulose, is conveniently treated with the diazotized poly-amino-phthalocyanine by immersing it at 0°–30° C. in an aqueous solution of the latter. The diazotized tetra-aminophthalocyanines usable as starting materials are described in copending application of Haddock, Serial No. 335,871 (Patent No. 2,280,072, issued April 21, 1942), and may be obtained by the process set out therein. The corresponding compounds of lesser diazo content may be prepared by reducing and diazotizing in similar manner the dinitro and trinitro-phthalocyanines described in British Patent No. 541,146, p. 2, lines 104–111; p. 4, lines 68–78).

Taking the tetra-amino-phthalocyanine as typical, the same may be diazotized ready for use, or there may be employed solutions of the metallic double salts of the diazotized tetra-amino-phthalocyanine, or the corresponding alkali-metal isodiazotates. Metallic tetra-amino-phthalocyanines other than those of copper may be used for preparing diazo compounds suitable for use in the process of the invention; for example, those of magnesium, cobalt, nickel, lead or aluminium, which are conveniently prepared by heating the appropriate metal or metal salt with a nitrophthalonitrile and reducing the resulting tetra-nitrophthalocyanine. Metal-free tetra-amino-phthalocyanines can also be used.

The invention is illustrated but not limited by the following examples in which the parts are by weight.

*Example 1*

10 parts of cotton yarn are immersed for 1 hour at 10° C., with occasional turning, in 350 parts of the solution of tetra-diazotized copper tetra-(4)-amino-phthalocyanine obtained as described below. The cotton yarn is then removed from the solution, squeezed, rinsed in cold water and boiled for 10 minutes in 200 parts of water, removed, squeezed and dried. In this manner there is produced on the yarn a greenish-blue shade of outstanding fastness to washing and good light fastness.

The solution of tetra-diazotized copper tetra-(4)-amino-phthalocyanine used above is made as follows:

To a stirred suspension of 2 parts of copper tetra-(4)-amino-phthalocyanine in 40 parts of water mixed with 50 parts of 33% aqueous hydrochloric acid, at 5° C., there is rapidly added a solution of 1 part of sodium nitrite dissolved in 20 parts of water. The dark-green solution so obtained is filtered and diluted to 1400 parts with equal quantities of ice and water.

*Example 2*

10 parts of cotton yarn are impregnated with tetra-diazotized copper tetra-(4)-amino-phthalocyanine in the manner described in Example 1. The cotton is then removed from the solution, squeezed and treated at about the boiling point for 10 minutes in 250 parts of water containing 0.1 part of potassium bromide. The cotton yarn is taken out, squeezed and dried. It is dyed in a bright greenish-blue shade of excellent fastness to washing.

*Example 3*

The procedure is the same as in Example 2 except that the potassium bromide therein is replaced by one of the following reagents in the quantities indicated, obtaining respectively the following results:

| Reagent | Shade produced |
| --- | --- |
| 0.1 part of sodium ethyl xanthate in 250 parts of water. | Green. |
| 0.1 part of potassium iodide in 250 parts of water. | Greenish-blue. |
| 5 parts of pyridine in 250 parts of water. | Do. |

*Example 4*

Cotton yarn was impregnated with copper tetra-(4)-amino-phthalocyanine as set forth in Example 1. A sodium stannite bath was then made up by dissolving 0.2 part of stannous chloride ($SnCl_2.2H_2O$) with the aid of a minimum of 33% aqueous sodium hydroxide solution, and diluting with water to a total of 250 parts by weight. The impregnated yarn, after squeezing, was treated in this bath at about the boiling point for 10 minutes. It was then taken out, squeezed and dried. A greenish-blue shade was obtained, of good fastness to washing.

*Example 5*

The procedure is the same as in Example 4, except that the aqueous sodium stannite bath is replaced by 250 parts of methylated spirits. A bright greenish-blue shade was obtained.

*Example 6*

The procedure is the same as in Example 2 except that in place of the solution of tetradiazotized copper tetra-(4)-amino-phthalocyanine employed in said example, there is employed instead, with similar results, a solution of 1 part of the zinc chloride double salt of tetradiazotized copper tetra-(4)-amino-phthalocyanine in 200 parts of water. The double salt is made as follows:

There is mixed with a paste of 12.3 parts of copper tetra-(4)-amino-phthalocyanine and 150 parts of water, a solution of 6 parts of sodium nitrite in 20 parts of water. The mixture is cooled to 0.5° C. and quickly dropped into 90 parts of well-stirred hydrochloric acid of sp. gr. 1.16 at like temperature. Into the resulting dark green solution there is then poured a solution of 25 parts of zinc chloride ($ZnCl_2.H_2O$) in 50 parts of ½% hydrochloric acid. The zinc chloride double salt is thrown down as a precipitate and is filtered off, washed with acetone and dried.

*Example 7*

The procedure is the same as in Examples 2 to 4, except that in lieu of the tetradiazotized-tetra-amino-copper-phthalocyanine employed in said example, there is used an equal weight of tetradiazotized cobalt or nickel tetra-(4)-amino-phthalocyanine. The shades produced are similar to those in Examples 2 to 4, respectively.

*Example 8*

5 parts of a 5% aqueous paste of copper tetra-(4)-amino-phthalocyanine, 5 parts of 33% hydrochloric acid, 5 parts of 5% aqueous sodium nitrite solution and 300 parts of water are stirred together at 170° C. 15 parts of cotton in the form of hanks are immersed in this green solution for ½ hour at 17–19° C., additions of 15 parts of 15% sodium chloride solution being made after 10 and 20 minutes. The material is squeezed and portions are treated in boiling aqueous solutions, of the strength indicated, of the following reagents.

| Reagent | Strength of solution | Shade produced |
| --- | --- | --- |
| | Percent | |
| Sodium thiosulphate | 5 | Bluish-green. |
| Benzoquinone | 2 | Green. |
| Hydrazine sulphate | 2 | Greenish-grey. |
| Potassium cyanate | 5 | Green. |
| Sodium formate | 5 | Bluish-green. |
| Sodium hypophosphite | 2 | Greenish-blue. |
| Sodium thiocyanate | 2 | Bluish-green. |
| Sodium cuprocyanide | 6 | Greenish-blue. |
| Formaldehyde | 0.6 | Green. |
| mixed with— | | |
| Sodium hydroxide | 0.5 | |

All the above shades are outstandingly fast to soap boiling and possess good light fastness.

*Example 9*

To a stirred suspension of two parts of copper-tetra-(4)-amino-phthalocyanine in 40 parts of water mixed with 50 parts of 33% aqueous hydrochloric acid at 5° C., there is rapidly added a solution of 1 part of sodium nitrite dissolved in 20 parts of water. The dark green solution so obtained is filtered, and cotton cloth is padded with this solution in such a way that an amount of solution equal to the original weight of the cloth is left in the fiber. Ten parts of this cotton cloth (dry basis) are then boiled for 10 minutes in 200 parts of water, removed, squeezed, and dried. In this manner there is produced a greenish blue shade of outstanding fastness to washing and good light fastness.

To the water, in the last step above, there may be added 1 part of sodium carbonate; the shade is green blue as before. If, in place of the sodium carbonate in the above aftertreatment, sodium cupro-cyanide is used, a bluish dyeing is obtained which has outstanding fastness to washing and good light fastness. If, in place of the boiling water, as the aftertreating agent, boiling ethanol or boiling propanol is used, blue dyeings are obtained with outstanding fastness to washing and good light fastness. Besides the reagent mentioned specifically in this example as aftertreating agent, any of the others disclosed in this specification may be substituted, as well as any other agent which facilitates the decomposition of diazonium groups.

Instead of preparing a solution of the diazo by azotizing copper tetra-(4)-amino-phthalocyanine, the solution may be obtained by acidifying a solution of an inorganic double salt of copper phthalocyanine-tetra-(4)-diazonium chloride, of an alkali isodiazotate of copper phthalocyanine-tetra-(4)-diazonium chloride, or of an aromatic sulfonic acid salt of azotized copper tetra-(4)-amino-phthalocyanine.

*Example 10*

Cotton cloth is printed with a printing paste prepared by thickening with locust-bean gum the tetra-diazo-copper-phthalocyanine obtained in Example 9. After steaming for five minutes, soaping, rinsing, and drying, a green print is obtained which has very good wash fastness and good light fastness. Instead of steaming the prints to fix the phthalocyanine compound on the fiber, the cotton cloth so printed may be boiled in water, boiled in alcohol or treated with aqueous solutions of any of the previously mentioned reagents which facilitate removal of the diazonium groups.

Similarly cotton cloth is printed with a printing paste consisting of the potassium isodiazotate derived from copper phthalocyanine tetra-(4)-diazonium chloride (obtained as described below), neutral starch-tragacanth thickening, Turkey red oil and water. After steaming for ten minutes, soaping, rinsing and drying, a blue-green print is obtained which has very good wash fastness and good light fastness.

The potassium tetra-(4)-iso-diazotate of copper phthalocyanine hereinabove mentioned may be made as follows:

30 parts of finely divided copper tetra-(4)-amino-phthalocyanine in the form of an aqueous paste are mixed with 350 parts of water and 150 parts of concentrated aqueous hydrochloric acid (sp. gr. 1.16). To the mixture at 5° C. is added a solution of 15 parts of sodium nitrite in 50 parts of water. The temperature is maintained throughout at 5° C. or below. The dark green diazo solution is now added to a stirred mixture at −10° C. of 1200 parts of potassium hydroxide and 800 parts of water. The green solution so obtained is added rapidly to a mixture of 1600 parts of potassium hydroxide and 400 parts of water previously heated to 120°. The temperature is maintained at not less than 120° C. during the addition. The mixture is cooled to 100° C. and the tetraisodiazotate, in suspension, is filtered off through asbestos paper. It is pressed under vacuum till dry. The product is a dark green powder soluble in cold water to give a bluish green solution.

It will be noted that in most of the above examples the heating was done at the boiling point in the treatment bath. However, considerable variation from said temperature may be practiced, the treatment being carried out anywhere from room temperature to the boiling point of the treatment bath. Thus, in the case of the alcohol treatment in Example 5, the temperature of 78° C. was employed. In general, the heating of the treatment bath will affect only the speed of the reaction but not the ultimate shade obtained or the fastness thereof.

Inasmuch as the diazo solution of tetra-amino-copper-phthalocyanine tends to decompose on standing, it is advisable to have the same prepared fresh and apply it to the fiber as quickly as possible. If desired, instead of the free diazonium compound, acid solutions of its double salts with inorganic compounds, for instance zinc chloride, or its compounds with aromatic sulfonic acids, for instance 1,5-naphthylene-disulfonic acid, may be used. (See U. S. Patent No. 2,280,072). We have found, incidentally, that a considerable degree of stabilization may be achieved by adding surface-active quaternary ammonium compounds, such as long-chain-alkyl-pyridinium halides. Thus we have found that the addition to the dye bath of 0.25% of cetyl-pyridinium bromide in the presence of free hydrochloric acid would stabilize the tetradiazonium derivative of tetra-(4)-amino-copper-phthalocyanine to such an extent that after 2 hours at 17° C., the amount of decomposition found was slight.

In lieu of the tetradiazo compound obtained from copper-tetra-(4)-amino-phthalocyanine employed in the above examples, there may be used with equal success the tetradiazo-compound from copper-tetra-(3)-amino-phthalocyanine, the tridiazo compound obtained from copper-tri-(4)- or tri-(3)-amino-phthalocyanine, the bis-diazo compound from copper-diamino-phthalocyanine, also the corresponding diazonium compounds derived from cobalt and nickel tetra-amino and tri-amino-phthalocyanines, and the diazonium compounds derived from tetra-amino and tri-amino metal-free phthalocyanines.

The dyeings obtained on cellulosic material according to this invention are all characterized by good fastness to washing, soap boiling, open soda boiling, and light.

It will be understood that the detailed practice of our invention is susceptible to wide variation and modification within the skill of those engaged in this art.

We claim:

1. A process for coloring cellulosic fiber, which comprises impregnating the same with a polydiazonium compound obtained by diazotizing a polyamine of the phthalocyanine series, and then subjecting the impregnated fiber to treatment adapted to decompose the diazonium groups with liberation of nitrogen, producing a water-insoluble dyestuff on the fiber.

2. A process for coloring cellulosic fiber, which comprises impregnating the same with a solution of a polydiazonium compound obtained by diazotizing a tetra-amino-compound of the phthalocyanine series, and then treating the impregnated fiber with an agent adapted to facilitate decomposition of the diazonium groups with liberation of nitrogen, producing a water-insoluble dyestuff on the fiber.

3. A process for dyeing cellulosic fiber, which comprises impregnating the same with an aqueous solution of a polydiazonium compound obtained by diazotizing a tetra-amino-copper-phthalocyanine, and then treating the impregnated fiber at an elevated temperature with a reagent adapted to react with an aromatic diazonium compound to cause removal of the diazonium groups.

4. Cellulosic textile material colored with coloring matters produced on the fiber by a process as defined in claim 1.

5. Cellulosic textile material dyed by a process as defined in claim 3.

6. A process for dyeing cellulosic fiber which comprises impregnating the same with tetradiazotized copper-tetra-(4)-amino-phthalocyanine, and then heating the impregnated fiber in an aqueous treatment bath to decompose the diazonium groups with liberation of nitrogen, producing a water-insoluble dystuff on the fiber.

7. A process for dyeing cellulosic fiber which comprises impregnating the same with tetradiazotized copper-tetra-(4)-amino-phthalocyanine, and then heating the impregnated fiber in an alkanol treatment bath to decompose the diazonium groups with liberation of nitrogen, producting a water-insoluble dyestuff on the fiber.

8. A process of producing colored designs upon cellulosic fabric which comprises printing the same with a printing paste containing a polydiazotized copper tetra-amino-phthalocyanine, and then exposing the fabric to the action of steam to decompose the diazonium groups with liberation of nitrogen whereby to fix the color upon the fiber in the printed areas.

HAROLD BLACKSHAW.
NORMAN HULTON HADDOCK.